United States Patent [19]

Thompson et al.

[11] Patent Number: 4,554,131

[45] Date of Patent: Nov. 19, 1985

[54] ALUMINUM BATTERY ALLOYS

[75] Inventors: David S. Thompson, Richmond; Darwin H. Scott, Mechanicsville, both of Va.

[73] Assignee: The United States of America as represented by the Department of Energy, Washington, D.C.

[21] Appl. No.: 655,486

[22] Filed: Sep. 28, 1984

[51] Int. Cl.[4] ............................................. C22C 21/08
[52] U.S. Cl. ................................... 420/546; 420/547; 420/549; 420/550
[58] Field of Search ............... 420/544, 546, 547, 550, 420/553, 549

[56] References Cited

U.S. PATENT DOCUMENTS 3,343,948  9/1967  Raclot .................................. 420/544
4,166,755  9/1979  Fister, Jr. et al. .................. 420/550

Primary Examiner—L. Dewayne Rutledge
Assistant Examiner—Robert L. McDowell
Attorney, Agent, or Firm—Shyamala Rajender; L. E. Carnahan; Judson R. Hightower

[57] ABSTRACT

Aluminum alloys suitable for use as anode structures in electrochemical cells are disclosed. These alloys include iron levels higher than previously felt possible, due to the presence of controlled amounts of manganese, with possible additions of magnesium and controlled amounts of gallium.

11 Claims, No Drawings

ALUMINUM BATTERY ALLOYS

The U.S. Government has rights in this invention pursuant to Subcontract No. 6124909 awarded to Reynolds Metals Company under DOE Prime Contract No. W-7405-ENG-48 between the U.S. Department of Energy and the University of California, for the operation of the Lawrence Livermore National Laboratory.

The subject invention relates generally to aluminum alloys and more particularly to aluminum alloys for use as battery electrodes.

BACKGROUND OF THE INVENTION

Numerous aluminum alloys have been proposed in the past for use as anodes in fuel cells, electrochemical couples, and in what is generally referred to as batteries. While some of these alloys are suitable for such use, their preparation and wide use have not become a commercial reality. A major stumbling block in the preparation and commercialization of aluminum alloys and aluminum alloy anode batteries is their relatively high cost because to construct efficient batteries with these aluminum alloy anodes, the aluminum has to be at a very high purity level and the cost of the production of such high purity aluminum becomes prohibitive.

U.S. Pat. Nos. 4,107,406 and 4,150,204 teach an aluminum alloy anode for use in batteries but requires the use of 99.997% pure aluminum, to which other alloying ingredients are added. The production of aluminum at this level of purity requires stringent production control measures and conditions, and cannot be produced by the conventional production reduction cell method. The amount of electricity required to produce aluminum at this level of purity is about twice that used in production cells thus making it very energy-inefficient and prohibitively expensive. Furthermore, the common impurity found in normal production aluminum is iron. Iron is also usually found in other parts of the reduction cell, handling and testing equipment, the walls of the cell and other operating components and processes that it may eventually find its way into the anode alloy. The presence of iron in the form of $FeAl_3$ in aluminum alloys, even at low levels, creates locations for internal electrochemical reactions between the iron and the aluminum, within the anode itself, thereby reducing the coulombic efficiency of the cell. The prior art method, therefore, requires that in order for the battery to be cost-effective and operate energy-efficiently, the levels of iron impurity must be controlled to be below about 0.02% by weight, which is extremely difficult to achieve.

There is a need, therefore, for an aluminum alloy for use as anode material for batteries which not only exhibits satisfactory electrical properties but which also lends itself to production from a base aluminum as produced in a typical production aluminum reduction cell.

Accordingly, it is an object of the subject invention to provide energy-efficient, cost effective electrochemical cells which utilize aluminum-alloy anodes.

It is another object of the present invention to provide energy-efficient, cost effective electrochemical cells with aluminum-alloy anodes in which the presence of other metals as impurities do not impair the electrical properties of the cells.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention as embodied and broadly described herein, the subject invention is directed to aluminum alloys for use as an anode in electrochemical cells and the like which exhibits satisfactory electrochemical properties and which is cost effective and energy-efficient. The aluminum alloys of the instant invention comprise from about 0.02 to about 0.15% by weight of iron, from about 0.02% to about 0.30% by weight of manganese, from about 0.01% to about 0.07% by weight of gallium and the balance being made up of aluminum with its inherent impurities. Magnesium is an optional constituent of the subject alloys and may be present in an amount upto about 5.0% by weight. Silicon may be present, as an impurity, in amount of from about 0.01 to about 0.3% by weight. The aluminum utilized is, therefore, at levels ranging from about 94.18% to about 99.95% by weight. Other impurities which are inherent in typical aluminum ores or production aluminum preparations may also be present in varying amounts. Aluminum at the required purity level may be easily prepared in typical production aluminum reduction cells. Test specimens of the subject aluminum alloys having varying compositions were prepared and tested in an experimental electrochemical cell. The alloys of the present invention exhibit desirable electrochemical properties and provide suitable material for use as anodes in electrochemical cells and the like.

DETAILED DESCRIPTION OF THE PREFERRED EMBODIMENTS

The present invention provides aluminum alloys for use as anodes in electrochemical cells such as batteries. The alloys of the subject invention generally comprise aluminum, iron, manganese, and gallium in varying amounts. They may additionally include magnesium. Silicon may also be present as an impurity in the aluminum. All amounts reported herein are percentages by weight unless otherwise specified. Typically, the subject alloys comprise about 0.02 to about 0.15%, preferably about 0.02 to about 0.10% of the undesirable element iron, about 0.02 to about 0.30%, preferably about 0.02 to about 0.2% manganese, about 0.01 to about 0.07%, preferably about 0.02 to about 0.06% gallium, 0 to about 5.0%, preferably about 0.20 to about 2.0% magnesium, silicon, in an amount which is typically from about one half to twice the amount of iron, which may be present as an impurity in the aluminum and the balance being made up of aluminum with its inherent impurities. The levels of aluminum are generally in the range of from about 94.18 to about 99.95%. Other impurities which are inherent in typical aluminum ores or production aluminum preparations may also be present in varying amounts.

These alloys may be easily prepared employing as a base, aluminum from a production reduction cell and alloying the aluminum thus obtained with any or all of the other alloying components to any desirable composition.

Preferred compositions of the subject alloys contain aluminum from a production reduction cell combined with appropriate amounts of gallium, manganese and, optionally, magnesium. Typical of the production base aluminums from which the subject alloys may be constituted are designated 4A aluminum which has a composition of about 99.8% aluminum, about 0.13% iron, about 0.06% silicon and about 0.01% other impurities; 5A aluminum which has a composition of about 99.85% aluminum, about 0.09% iron, about 0.05% silicon and about 0.01% other impurities; and 6A aluminum which has a composition of about 99.9% aluminum, about 0.06% iron, 0.03% silicon and 0.01% other impurities.

The iron present in the subject compositions is usually carried in the base aluminums utilized and is not externally added. As mentioned earlier, the presence of iron interferes with the efficiency and the electrochemical properties of aluminum. Manganese is included in the subject compositions to counteract the effects of iron thereby increasing the tolerance of the anode material for the undesirable presence of iron which is invariably or inevitably present in the production cell aluminums as an impurity. When there is no manganese present, the iron forms $FeAl_3$, which is cathodic to the aluminum matrix surrounding it, forming local sites for electrochemical activity within the anode itself thereby reducing the coulombic efficiency of the cell. With manganese present, $FeMnAl_6$ is apparently the complex formed which is more similar in its electrochemical potential to the surrounding aluminum matrix thereby substantially reducing the local electrochemical activity which interferes with cell efficiency. An additional or alternative postulated reason for the neutralizing effect of manganese is that $FeAl_3$ particles have an elongated shape thus providing many potential surface sites for electrochemical activity whereas $FeMnAl_6$ which is more spherical in shape provides far fewer surface sites for electrochemical activity.

The additional presence of gallium in limited amounts provides increased electrical potential to the aluminum. The levels of gallium however, must be carefully controlled since excessive amounts of gallium adversely affects the coulombic efficiency of the cell. The addition of magnesium also aids in the formation of a more suitable anodic material, since its presence results in a material with a more negative potential and a higher coulombic efficiency.

The following examples are presented by way of example only and for purposes of illustration and are not to be construed as limiting the scope of the invention in any manner. Test specimens of the subject aluminum alloys having varying compositions were prepared. All of the compositions described in the following examples and in Table 1, were prepared using aluminum of 99.99 weight percent base purity to which the desired levels of other alloying minerals metals and/or trace elements were added. The fabrication procedures are detailed in the examples which are presented.

TABLE 1

| Example No. | Si | Fe | Cu | Mn | Mg | Cr | Ni | Ga | Zn | Ti |
|---|---|---|---|---|---|---|---|---|---|---|
| 1 | .006 | .007 | <.005 | .002 | .84 | <.002 | <.002 | .04 | <.005 | <.005 |
| 2 | .01 | .04 | <.01 | <.01 | .78 | <.01 | <.01 | .04 | <.01 | <.01 |
| 3 | .02 | .06 | <.01 | <.01 | .77 | <.01 | <.01 | .04 | <.01 | <.01 |
| 4 | <.01 | .01 | <.01 | <.01 | .84 | <.01 | <.01 | .02 | <.01 | <.01 |
| 5 | <.01 | .01 | <.01 | <.01 | .80 | <.01 | <.01 | .05 | <.01 | <.01 |
| 6 | .03 | .04 | <.01 | .04 | .77 | <.01 | <.01 | .04 | <.01 | <.01 |
| 7 | .04 | .04 | <.01 | .04 | .81 | <.01 | <.01 | .04 | <.01 | <.01 |
| 8 | .05 | .04 | <.01 | .08 | .80 | <.01 | <.01 | .04 | <.01 | <.01 |
| 9 | .04 | .05 | <.01 | .21 | .77 | <.01 | <.01 | .04 | <.01 | <.01 |
| 10 | .008 | .009 | <.005 | <.005 | <.005 | <.005 | <.005 | .04 | <.005 | <.005 |
| 11 | .06 | .04 | <.01 | .04 | <.01 | <.01 | <.01 | .04 | <.01 | <.01 |
| 12 | .04 | .04 | <.01 | .08 | <.01 | <.01 | <.01 | .04 | <.01 | <.01 |
| 13 | .05 | .04 | <.01 | .17 | .40 | <.01 | <.01 | .04 | <.01 | <.01 |
| 14 | .06 | .04 | <.01 | .20 | .21 | <.01 | <.01 | .04 | <.01 | <.01 |

Chemical Analysis (Wt. %)

EXAMPLE 1

A DC cast ingot of 4"×14" cross section was produced, four pieces, each 11" wide were cut, scalped to 3.5" thickness, cold rolled to 1" thickness, homogenized for 1.5 hours at 1000° F., fan cooled to 400° F., then still air cooled to ambient temperature and cold rolled to 0.25" thickness.

EXAMPLES 2 through 6

A DC cast ingot of 3"×8" cross section was produced, scalped to 2.75" thickness, cold rolled to 1" thickness, homogenized for one hour at 1000° F., fan quenched to 400° F., then still air cooled to ambient temperature and cold rolled to 0.125" thickness.

EXAMPLES 7 through 9 and 11 through 14

A 3"×8" cross section DC cast ingot was produced, a 2.5" thick piece cut from the ingot was hot rolled to 0.25" thickness, maintaining the temperature between 650° F. and 1000° F., followed by air cooling.

EXAMPLE 10

A DC cast ingot 4"×14" cross section was produced, four pieces 11' wide were cut and scalped to 3.5" thickness. They were then cold rolled to 1' thickness, homogenized for one hour at 1000° F., fan cooled to 400° F., then still air cooled to ambient temperature and cold rolled to 0.25" thickness.

The compositions of the alloys prepared as shown in examples 1 through 14 are presented in Table 1. These alloy materials were tested in an experimental cell. Although the cell used is as described in Example 15, other types of cells and other suitable electrolytes known to those skilled in the art may be utilized.

EXAMPLE 15

An all PLEXIGLASS TM test cell was divided into two air-tight compartments separated by a NAFION TM 125perfluorosulfonic acid semi-permeable membrane, a dupont product. One of the compartments contained three carbon counter electrodes and held approximately one liter of an electrolyte. The anode side of the cell contained approximately three liters of the electrolyte. The electrolyte consisted of a 4.0M solution of NaOH containing 1.0M Al and 0.06M Sn. The temperature of this solution was maintained at 60° C. by immersing the test cell in a constant temperature bath. A magnetic stir bar in the anode compartment provided the necessary agitation of the solution. The experimental test anodes were 2.54 cm disks machined from the plate material. These disks were mounted in a PLEXIGLASS TM holder such that the exposed area was 5.07 cm². Prior to exposure, the disk surface was sanded to a 600 grit finish and cleaned in a 4M NaOH solution for several minutes. The test disks were immersed in the solution and a constant anodic current having a current density (I) over the range of 0 through 300Ma/cm² was imposed. The experimental parameters measured were the rate of hydrogen evolution at the anode (dv/dt) and the anode potential. The rate of hydrogen evolution at the anode was determined by displacing liquid from the cell to an open-ended manometer. All measurements were made at atmospheric pressure by varying the position of the manometer tube such that the levels of the fluid at the beginning and the end of each test was the same. An air valve on the anode compartment allowed for setting the solution level in the manometer at the beginning of each test. The current density associated with localized corrosion on the anode alloy (i, ma/cm²) was calculated from the measured rate of hydrogen evolution at the anode by use of the following equation which is derived from Faraday's law, the ideal gas law and Dalton's law:

$$i = \frac{dv}{dt} \cdot \frac{2F}{A} \cdot \frac{P_{atm} - P_{H_2O}}{RT}$$

where
  dv/dt = rate of hydrogen evolution
  A = surface area of the anode exposed to the electrolyte
  F = Faraday constant
  $P_{atm}$ = Atmospheric pressure
  $P_{H_2O}$ = partial pressure of the water vapor above the electrolyte
  R = gas constant
  T = absolute temperature.

The anode potential (E) was monitored versus a Hg/HgO electrode by means of a LUGGIN TM capillary placed in close proximity to the anode surface. The percentage of the coulombic efficiency of the anode (Eff) was calculated using the equation:

$$Eff (\%) = \frac{I}{I + i} \times 100$$

EXAMPLE 16

The effect of varying the amounts of iron in the subject aluminum alloys on the potential and coulombic efficiency of the aluminum anode alloys of the compositions described in Examples 1, 2 and 3 is presented in Table 2. As the figures in Table 2 indicate, the anode potential at a given current density decreases with increasing iron levels (with no manganese being simultaneously present). The coulombic efficiency decreases at a given current density with increasing iron levels (with no manganese present). This is consistent with prior art reports that the presence of iron in aluminum anode alloys adversely affects the coulombic efficiency of the electrochemical cell. Note that there are extremely low levels of manganese in each of the compositions shown in Table 2.

TABLE 2

| Impressed Current Density (ma/cm²) | Example 1 | | | Example 2 | | | Example 3 | | |
|---|---|---|---|---|---|---|---|---|---|
| | E | i | Eff | E | i | Eff | E | i | Eff |
| 0 | 1782 | 32 | — | 1610 | 492 | — | 1580 | 540 | — |
| 20 | 1740 | 24 | 45 | 1590 | 451 | 4 | 1550 | 512 | 4 |
| 40 | 1725 | 23 | 63 | 1560 | 426 | 9 | 1520 | 479 | 8 |
| 99 | 1669 | 36 | 73 | 1420 | 390 | 20 | 1450 | 411 | 19 |
| 197 | 1580 | 34 | 85 | 1320 | 318 | 38 | 1310 | 392 | 33 |
| 296 | 1450 | 29 | 91 | 1180 | 255 | 54 | 1170 | 282 | 51 |

E = −mv v. Hg/HgO
i = ma/cm²
Eff = % coulombic efficiency

EXAMPLE 17

The effect of gallium on the coulombic efficiency of the experimental electrochemical cell was also tested. The alloys obtained as described in examples 1, 4 and 5 were utilized for this experiment. The levels of gallium were progressively increased and the cell potential measured for each of the gallium levels used. The results are presented in Table 3. As the data indicate, increasing the levels of gallium in the anode alloy, in general, resulted in the anode alloy having a more negative electrochemical potential but the anode also exhibited a decreased efficiency. Thus the optimum levels of gallium in the anode alloy is based on a compromise between the required efficiency of the anode and the desired negative electrochemical potential.

TABLE 3

| Impressed Current Density (ma/cm²) | Example 4 | | | Example 1 | | | Example 5 | | |
|---|---|---|---|---|---|---|---|---|---|
| | E | i | Eff | E | i | Eff | E | i | Eff |
| 0 | 1720 | 19 | — | 1782 | 32 | — | 1840 | 42 | — |
| 20 | 1650 | 14 | 59 | 1740 | 24 | 45 | 1790 | 40 | 33 |
| 40 | 1610 | 13 | 75 | 1725 | 23 | 63 | 1750 | 39 | 51 |
| 99 | 1490 | 12 | 89 | 1699 | 36 | 73 | 1640 | 38 | 72 |
| 197 | 1290 | 11 | 95 | 1580 | 34 | 85 | 1450 | 34 | 85 |
| 296 | 1120 | 7 | 98 | 1490 | 29 | 91 | 1270 | 25 | 92 |

E = −mv v. Hg/HgO
i = ma/cm²
Eff = % coulombic efficiency

EXAMPLE 18

The effect of varying levels of manganese on cell performance were evaluated using the compositions described in examples 2, 6 through 9. The alloy of example 2 is essentially manganese free while the alloys of examples 6 through 9 contain manganese levels ranging from 0.04% to 0.21%. The results are tabulated in Table 4. As indicated by the data, addition of manganese to alloy samples which contain iron, at levels of up to about one to two times the levels of iron, produce significant improvement in both the anode potential and efficiency of the cell. However, at a ratio of 4 to 1 of manganese to iron, the efficiency of the anode decreases as compared to lower manganese concentrations, but is still superior to the manganese-free alloy. At higher current densities and high manganese levels, the anode passivates. The preferred manganese to iron ratio, therefore, is in the range of about 0.5 to about 2. The inclusion of manganese in these aluminum alloys as anode materials permits the use of alloys with higher iron content than were heretofore found to be possible.

current densities and increased magnesium levels, both the negative potential and the coulombic efficiency increase. At high current densities, the effect of magne-

TABLE 4

| Impressed Current Density (ma/cm$^2$) | Example 2 | | | Example 6 | | | Example 7 | | | Example 8 | | | Example 9 | | |
|---|---|---|---|---|---|---|---|---|---|---|---|---|---|---|---|
| | E | i | Eff | E | i | Eff | E | i | Eff | E | i | Eff | E | i | Eff |
| 0 | 1610 | 492 | — | 1680 | 89 | — | 1705 | 80 | — | 1717 | 84 | — | 1715 | 78 | — |
| 20 | 1590 | 451 | 4 | 1650 | 76 | 20 | 1689 | 60 | 25 | 1694 | 68 | 23 | 1701 | 75 | 21 |
| 40 | 1560 | 426 | 9 | 1630 | 63 | 39 | 1677 | 49 | 45 | 1670 | 50 | 44 | 1769 | 53 | 43 |
| 99 | 1420 | 390 | 20 | 1520 | 47 | 68 | 1630 | 28 | 78 | 1625 | 27 | 79 | 1622 | 102 | 49 |
| 197 | 1320 | 218 | 38 | 1350 | 34 | 85 | 1551 | 14 | 93 | 1528 | 16 | 92 | 1502 | 67 | 75 |
| 296 | 1180 | 255 | 54 | 1200 | 23 | 93 | 1479 | 9 | 97 | 1438 | 10 | 97 | * | * | — |

*anode passivated
E = −mv v. Hg/HgO
i = ma/cm$^2$
Eff = % coulombic efficiency

EXAMPLE 19

The effect of increasing magnesium levels in the anode alloy on the cell potential was measured employing the alloy compositions prepared as described in examples 1, 7, 8, 9, 10, 11, 12, 13 and 14 and the data are presented in Table 5. The compositions of examples 1 and 10 are essentially the same except for the higher magnesium level in the alloy of example 1. Both the compositions are low in iron content. As the data indicate, magnesium increases the negative potential of the anode and increases anode efficiency.

sium on the negative potential and coulombic efficiency decreases.

As the foregoing examples illustrate, aluminum alloys containing significantly higher levels of iron than present in prior art alloys, can be effectively used as anodes in electrochemical cells if the deleterious effects of iron can be balanced or counteracted by including in the alloy compositions optimum amounts of one or more of the elements, manganese, gallium and magnesium.

The foregoing description of the preferred embodiments of the subject invention have been presented for purposes of illustration and description and for a better

TABLE 5

| Impressed Current Density (ma/cm$^2$) | Example 1 | | | Example 10 | | | Example 7 | | | Example 11 | | |
|---|---|---|---|---|---|---|---|---|---|---|---|---|
| | E | i | Eff | E | i | Eff | E | i | Eff | E | i | Eff |
| 0 | 1782 | 32 | — | 1720 | 128 | — | 1705 | 80 | — | 1627 | 220 | — |
| 20 | 1740 | 24 | 45 | 1700 | 129 | 13 | 1689 | 60 | 25 | 1611 | 211 | 9 |
| 40 | 1725 | 23 | 63 | 1682 | 123 | 25 | 1677 | 49 | 45 | 1598 | 200 | 17 |
| 99 | 1669 | 36 | 73 | 1630 | 136 | 42 | 1630 | 28 | 78 | 1550 | 173 | 36 |
| 197 | 1580 | 34 | 85 | 1554 | 134 | 60 | 1551 | 14 | 93 | 1478 | 140 | 58 |
| 296 | 1490 | 29 | 91 | 1478 | 145 | 67 | 1479 | 9 | 97 | 1414 | 106 | 74 |

| Impressed Current Density (ma/cm$^2$) | Example 8 | | | Example 12 | | | Example 9 | | | Example 13 | | | Example 14 | | |
|---|---|---|---|---|---|---|---|---|---|---|---|---|---|---|---|
| | E | i | Eff | E | i | Eff | E | i | Eff | E | i | Eff | E | i | Eff |
| 0 | 1717 | 84 | — | 1607 | 252 | — | 1715 | 78 | — | 1670 | 119 | — | 1657 | 185 | — |
| 20 | 1694 | 68 | 23 | 1594 | 244 | 8 | 1701 | 75 | 21 | 1658 | 107 | 16 | 1647 | 150 | 12 |
| 40 | 1679 | 50 | 44 | 1582 | 233 | 15 | 1679 | 53 | 43 | 1645 | 87 | 31 | 1637 | 133 | 23 |
| 99 | 1625 | 27 | 79 | 1544 | 197 | 33 | 1622 | 102 | 49 | 1604 | 99 | 50 | 1603 | 134 | 42 |
| 197 | 1528 | 16 | 92 | 1476 | 146 | 57 | 1502 | 67 | 75 | 1508 | 67 | 75 | 1504 | 66 | 75 |
| 296 | 1438 | 10 | 97 | 1413 | 115 | 72 | * | * | — | * | * | — | 1291 | 22 | 93 |

*anode passivated
E= −mv v. Hg/HgO
i = ma/cm$^2$
Eff = % coulombic efficiency

The same results are obtained even with higher iron levels if magnesium is present in the alloy. The alloys of examples 7 and 11 contain equal amounts of iron, manganese and gallium and thus essentially equivalent for electrochemical purposes except that the alloy of example 7 contains an increased level of magnesium. Once again, increasing the levels of magnesium increased the negative potential and the anode efficiency.

When the level of manganese is about twice that of iron as in the case of the alloys of examples 8 and 12, increasing the level of magnesium increases the negative potential and the anode efficiency.

The effect of adding magnesium to compositions containing high levels of manganese is determined using the alloy compositions of examples 9, 13 and 14. At low understanding of the invention. It is not intended to be exhaustive or to limit the invention to the precise form or forms disclosed; and obviously, many modifications and variations are possible in light of the above teaching. The particular embodiments were chosen and described in some detail to best explain the principles of the invention and its practical application to thereby enable others skilled in the relevant art to best utilize the invention in various embodiments and with various modifications as are suited to the particular use contemplated. It is intended that the invention be defined by the claims appended hereto.

We claim:

1. An aluminum alloy consisting essentially of about 0.02 to about 0.15 weight percent of iron, about 0.02 to about 0.30 weight percent of manganese, about 0.01 to about 0.07 weight percent of gallium, the balance being made of aluminum with its inherent impurities, wherein said iron and said aluminum are provided from a base aluminum material produced in a production aluminum reduction cell.

2. The alloy of claim 1 further including up to about 5 weight percent of magnesium.

3. The alloy of claim 2 further including silicon in an amount ranging between about one half to about twice that of the iron present.

4. The alloy of claim 3 wherein said base aluminum material is 4A aluminum.

5. The alloy of claim 3 wherein said base aluminum material is 5A aluminum.

6. The alloy of claim 3 wherein said base aluminum material is 6A aluminum.

7. An aluminum alloy for use as anodic material in an electrochemical cell consisting essentially of about 0.02 to about 0.10 weight percent of iron, about 0.02 to about 0.20 weight percent of manganese, about 0.02 to about 0.06 weight percent of gallium, about 0.20 to about 2.00 weight percent of magnesium, the balance being made of aluminum with its inherent impurities, wherein said iron and said aluminum are provided from a base aluminum material produced in a production aluminum reduction cell.

8. The alloy of claim 7 further including silicon in an amount ranging between about one half to about twice that of the iron present.

9. The alloy of claim 8 wherein said base aluminum material is 4A aluminum.

10. The alloy of claim 8 wherein said base aluminum material is 5A aluminum.

11. The alloy of claim 8 wherein said base aluminum material is 6A aluminum.

* * * * *